United States Patent
Zhao

(10) Patent No.: US 11,281,494 B2
(45) Date of Patent: Mar. 22, 2022

(54) BUSINESS OPERATION METHOD, APPARATUS, AND SYSTEM FOR DETERMINING AND EXECUTING OPERATION TASKS IN CLOUD COMPUTING

(71) Applicant: HUAWEI TECHNOLOGIES CO., LTD., Shenzhen (CN)

(72) Inventor: Kai Zhao, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 396 days.

(21) Appl. No.: 16/442,546

(22) Filed: Jun. 16, 2019

(65) Prior Publication Data

US 2019/0310884 A1 Oct. 10, 2019

Related U.S. Application Data

(63) Continuation of application No. PCT/CN2017/104095, filed on Sep. 28, 2017.

(30) Foreign Application Priority Data

Dec. 16, 2016 (CN) .......................... 201611168837.2

(51) Int. Cl.
*G06F 9/46* (2006.01)
*G06F 9/48* (2006.01)
(Continued)

(52) U.S. Cl.
CPC .............. *G06F 9/4881* (2013.01); *G06F 8/60* (2013.01); *G06F 16/2379* (2019.01)

(58) Field of Classification Search
CPC ....... G06F 9/4881; G06F 16/2379; G06F 8/60
See application file for complete search history.

(56) References Cited

U.S. PATENT DOCUMENTS

2005/0080811 A1 4/2005 Speeter et al.
2008/0134164 A1* 6/2008 Stich .......................... G06F 8/65
717/172
(Continued)

FOREIGN PATENT DOCUMENTS

| CN | 103473100 A | 12/2013 |
|---|---|---|
| CN | 103582867 A | 2/2014 |

(Continued)

*Primary Examiner* — Wissam Rashid
(74) *Attorney, Agent, or Firm* — Maier & Maier, PLLC

(57) ABSTRACT

Various embodiments provide an operation method and apparatus, and a cloud computing system. Under the method, an operation target can be received; and an operation task to be executed for implementing the operation target of the business can be determined based on the operation target and current running data. The operation target can indicate a target topology and/or target software of the business, and the current running data can include a current topology of the business and currently running software. If there are a plurality of operation tasks, dependencies between the operation tasks can be determined, and the operation tasks can be executed based on the dependencies between the operation tasks. The method implements automatic execution of a maintenance operation and greatly improves efficiency of the maintenance operation in cloud computing.

12 Claims, 11 Drawing Sheets

(51) Int. Cl.
*G06F 8/60* (2018.01)
*G06F 16/23* (2019.01)

(56) References Cited

U.S. PATENT DOCUMENTS

2014/0123129 A1   5/2014  Risbood et al.
2016/0217403 A1   7/2016  Gupte et al.

FOREIGN PATENT DOCUMENTS

| CN | 104699508  A  | 6/2015 |
| CN | 105518648  A  | 4/2016 |
| CN | 105704188  A  | 6/2016 |
| WO | 2013184140 A1 | 12/2013 |

* cited by examiner

Business
- Business solution name

Applications (1 to N)
- Application name

Components (1 to N)
- Component name
- Quantity of component nodes

Softwares (1 to N)
- Software name
- Software version

Software dependency

Specification of a node resource
- Specification of a computing resource
- Specification of a storage resource
- Specification of a network resource
- Specification of a virtual machine image Component dependency Services (1 to N)
- Service name
- Service scale Components (1 to N)
- Component name
- Quantity of component nodes Softwares (1 to N)
- Software name
- Software version Software dependency Specification of a node resource
- Specification of a computing resource
- Specification of a storage resource
- Specification of a network resource
- Specification of a virtual machine image Component dependency Service usage relationship

FIG. 2

BUSINESS OPERATION METHOD, APPARATUS, AND SYSTEM FOR DETERMINING AND EXECUTING OPERATION TASKS IN CLOUD COMPUTING

CROSS-REFERENCE TO RELATED APPLICATIONS

This application is a continuation of International Application No. PCT/CN2017/104095, filed on Sep. 28, 2017, which claims priority to Chinese Patent Application No. 201611168837.2, filed on Dec. 16, 2016, The disclosures of the aforementioned applications are hereby incorporated by reference in their entireties.

TECHNICAL FIELD

The present invention relates to communications technologies, and in particular, to a business operation method and apparatus, and a cloud computing system.

BACKGROUND

Cloud computing is a computing manner in which a computing capability is obtained from a service provider for use. In a cloud computing environment, a user provides a business requirement in a particular form in advance, and submits the business requirement to Platform as a Service (PaaS) in the cloud computing environment. The PaaS automatically requests, according to the business requirement, Infrastructure as a Service (IaaS) in the cloud computing environment for various resources required by a business, deploys business software, and completes configuration on the software and the resources, to create an instance that can be run. In a running process after business creation is completed, various maintenance operations such as software upgrading and topology changing may need to be performed on the business at any time. A business may include a large quantity of applications and services. These applications and services may be deployed on different virtual machines. Therefore, a process of performing maintenance operations on the business is very complex.

In the prior art, when maintenance operations such as software upgrading and topology changing are performed on a business, respective manual operations are required for different operation types. For example, if a user expects to perform operations of software upgrading and topology changing on an object in a business, the user needs to first specify a to-be-upgraded software package and then create an upgrading task to perform software upgrading. Further, the user needs to select a topology changing type, perform configuration based on the topology changing type, and then create a changing task to perform topology changing. In addition, if software upgrading and topology changing need to be performed on a plurality of objects in a business, the foregoing manual operation process needs to be performed on each object.

However, in the prior art, respective manual operations are required for different operation types, leading to low efficiency of a business maintenance operation.

SUMMARY

Embodiments of the present invention provide a business operation method and apparatus, and a cloud computing system, for resolving a problem of low business maintenance efficiency caused by manual operations respectively performed for different operation types in the prior art.

A first aspect of the embodiments of the present invention provides a business operation method. In the method, after receiving an operation target of a business, a cloud computing system determines, based on the operation target of the business and current running data of the business, an operation task that needs to be executed to implement the operation target of the business. The operation target of the business is used for indicating a target topology and/or target software of the business, and the current running data of the business includes a current topology of the business and currently running software. After determining the operation task that needs to be executed to implement the operation target of the business, if there are a plurality of operation tasks, the cloud computing system further determines dependencies between the operation tasks, and executes the operation tasks based on the dependencies between the operation tasks.

In the method, the operation task is automatically determined based on the operation target of the business. When there are a plurality of determined operation tasks, dependencies between the operation tasks may be automatically determined, and the operation tasks are further automatically executed in sequence based on the dependencies. In this way, automatic execution of a business maintenance operation is implemented, and efficiency of the business maintenance operation is greatly improved.

In a possible design, the operation target of the business includes a target application, a target service, a target service usage relationship, and a target component. When determining, based on the operation target of the business and the current running data of the business, at least one operation task that needs to be executed to implement the operation target of the business, the cloud computing system specifically performs the following process:

determining a difference between an object name in a target object and an object name in the current running data of the business;

determining an object deployment task if a first object name in the target object does not exist in the current running data of the business, where the object deployment task is used for deploying an object corresponding to the first object name; and determining an object deletion task if a second object name in the current running data of the business does not exist in the target object, where the object deletion task is used for deleting an object corresponding to the second object name, where the target object is the target application, the target service, the target service usage relationship, or the target component, and the object name is an application name, a service name, a service usage relationship name, or a component name.

In a possible design, the operation target of the business includes a target component node. When determining, based on the operation target of the business and the current running data of the business, at least one operation task that needs to be executed to implement the operation target of the business, the cloud computing system specifically performs the following process:

determining a difference between a quantity of component nodes in the target component node and a quantity of component nodes in the current running data of the business, where the quantity of component nodes is used for indicating a quantity of nodes in a component; and determining a node deployment task if the quantity of component nodes in the target component node is greater than the quantity of component nodes in the current running data of the business, where a quantity of nodes that need to be deployed in the node deployment task is a difference value between the quantity of component nodes in the target component node and the quantity of component nodes in the current running data of the business; or determining a node deletion task if the quantity of component nodes in the target component node is less than the quantity of component nodes in the current running data of the business, where a quantity of nodes that need to be deleted in the node deletion task is a difference value between the quantity of component nodes in the current running data of the business and the quantity of component nodes in the target component node.

In a possible design, the operation target of the business includes target node software. When determining, based on the operation target of the business and the current running data of the business, at least one operation task that needs to be executed to implement the operation target of the business, the cloud computing system specifically performs the following process:

determining a difference between a software name in the target node software and a software name in the current running data of the business;

determining a software deployment task if a first software name in the target node software does not exist in the current running data of the business, where an object of the software deployment task is software corresponding to the first software name;

determining a software deletion task if a second software name in the current running data of the business does not exist in the target node software, where an object of the software deletion task is software corresponding to the second software name; and determining, if a same software name exists in the target node software and the current running data of the business, a difference between software versions corresponding to the same software name in the target node software and the current running data of the business.

In a possible design, when the difference between the software versions corresponding to the same software name in the target node software and the current running data of the business is determined, the following process is specifically performed:

determining a software upgrading task if the software versions corresponding to the same software name in the target node software and the current running data of the business are different.

In a possible design, the operation target of the business includes a target node resource. When determining, based on the operation target of the business and the current running data of the business, at least one operation task that needs to be executed to implement the operation target of the business, the cloud computing system specifically performs the following process:

determining a difference between the target node resource and a node resource in the current running data of the business, where the node resource includes a computing resource, a magnetic disk resource, and a network resource; and determining a node resource maintenance task based on the difference between the target node resource and the node resource in the current running data of the business.

In a possible design, when determining the dependencies between the operation tasks, the cloud computing system specifically performs the following process:

determining dependencies between operation tasks of different task types based on priorities of the task types and the operation tasks, where the task types include a deployment type, a changing type, and a deletion type, a priority of the deployment type is higher than a priority of the changing type, and the priority of the changing type is higher than a priority of the deletion type; and determining dependencies between operation tasks of a same task type based on priorities of child task types of the same task type.

A second aspect of the present invention provides a business operation apparatus. The apparatus has a function of implementing the foregoing method. The function may be implemented by hardware, or may be implemented by hardware executing corresponding software. The hardware or software includes one or more modules corresponding to the foregoing function.

In a possible design, the apparatus may include a receiving module and a processing module. The receiving module and the processing module may execute corresponding functions in the foregoing method. For example, the receiving module is configured to receive an operation target of a business. The operation target of the business is used for indicating a target topology and/or target software of the business. The processing module is configured to determine, based on the operation target of the business and current running data of the business, an operation task that needs to be executed to implement the operation target of the business. The current running data of the business includes a current topology of the business and currently running software. The processing module is further configured to: when there are a plurality of operation tasks, determine dependencies between the operation tasks, and execute the operation tasks based on the dependencies between the operation tasks.

A third aspect of the present invention provides a business operation apparatus. The apparatus includes a memory and a processor. The memory is configured to store a program instruction. The processor is configured to invoke the program instruction in the memory, to implement the method according to the first aspect and implementations of the first aspect.

A fourth aspect of the present invention provides a cloud computing system. The cloud computing system includes the foregoing business operation apparatus.

Compared with the prior art, according to the solutions in the embodiments of the present invention, automatic execution of a business maintenance operation is implemented, and efficiency of the business maintenance operation is greatly improved.

BRIEF DESCRIPTION OF DRAWINGS

FIG. 2 is a diagram of an example of an application design of a business operation method embodiment according to an embodiment of the present invention;

DESCRIPTION OF EMBODIMENTS

A user may flexibly deploy and maintain a business by using a cloud computing system. For example, the user may submit a video business requirement to the cloud computing system in a form required by the cloud computing system, and the cloud computing system may request corresponding resources for the user based on application, service, component requirements and the like in the video business requirement, to create a business instance that can be run. In a running process of the business instance, the user may need to maintain a business topology or software related to the business at any time. A maintenance operation process may include the following steps.

Step 1: The user selects, on an interface of the cloud computing system, an object on which software upgrading or topology changing is to be performed in the business topology.

Step 2: If software upgrading is to be performed on the object, a software package to be upgraded is specified and an upgrading task is created for execution.

Step 3: If topology changing is to be performed on the object, a changing type needs to be selected, configuration is performed for different changing types, and then a changing task is created for execution.

Step 4: If software upgrading or different types of changing operations need to be performed on a plurality of objects in the business topology, step 1 to step 3 need to be repeatedly performed.

Step 5: If a dependency exists in software upgrading or topology changing, the user needs to create tasks in sequence and execute the tasks.

It can be learned from the foregoing operation process that when software upgrading or topology changing is to be performed for the business topology, respective manual operations are required for different operation types, and operations of a plurality of types cannot be automatically performed at a time. When a quantity of virtual machines in a business reaches a particular scale, for example, when a business includes 10000 virtual machines, the operations are manually performed. Obviously, efficiency of executing the operations is low. In addition, dependencies between the operations are manually determined by the user, and an execution order of various operations needs to be manually formulated, leading to low efficiency of a maintenance operation.

Based on the foregoing problem, various embodiments of can provide a business operation method. A series of operation tasks can be automatically determined based on an operation target of a user, and dependencies between the operation tasks can be automatically determined. Further, the operation tasks are automatically executed in sequence based on the dependencies, greatly improving operation efficiency.

Figure 1:
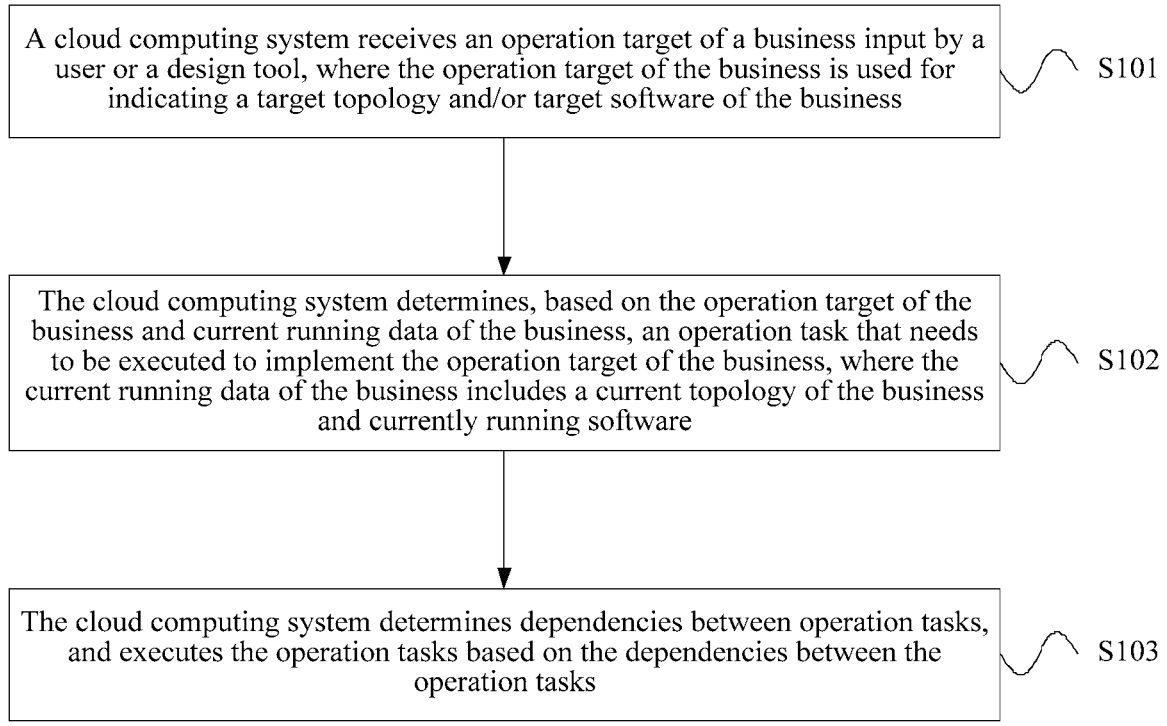
FIG. 1 is a schematic flowchart of a business operation method embodiment according to an embodiment of the present invention.

FIG. 1 is a schematic flowchart of a business operation method embodiment according to an embodiment of the present invention. The method is performed by a cloud computing system that can deploy various businesses, and specifically, PaaS in the cloud computing system. As shown in FIG. 1, the method includes the following steps.

S101: The cloud computing system receives an operation target of a business input by a user or a design tool, where the operation target of the business is used for indicating a target topology and/or target software of the business.

Optionally, the user may describe the operation target of the business by using an application design. The application design may also be referred to as an application template, and is an entity that carries static design data of the business and that is used in the cloud computing system. The PaaS may use the application design as an input of deploying an application, automatically request IaaS for computing, storage, and network resources by parsing data content in the application design, and then automatically deploy business software on the computing, storage, and network resources, to construct a business instance.

The user may directly import an application design created in advance into the cloud computing system, or may automatically import an application design into the cloud computing system by using a particular design tool. This is not limited in this embodiment of the present invention.

The operation target of the business may include a target application, a target service, a target service usage relationship, a target component, a target component node, target node software, and a target node resource.

FIG. 2 is a diagram of an example of an application design in the business operation method embodiment according to an embodiment of the present invention. As shown in FIG. 2, information about layers in a business topology needs to be described in the application design. The following describes the information about the layers in the application design in an order from an outer layer to an inner layer.

1. A Business Solution Name

A large quantity of businesses may be deployed in a same cloud computing system. The "business solution name" in the application design may be used for identifying a business on which an operation needs to be performed. That is, the business topology may be integrally described by using the business solution name. For example, the business solution name may be "video business" or the like.

2. Application and Service

A business solution includes one or more applications and services (represented by 1 to N in FIG. 2, where N is an integer greater than or equal to 1) that can be independently deployed and can independently provide a fixed business capability. The application refers to a functional unit or part that can provide a service capability for a user to use. The service refers to a functional unit or part that can provide a public capability for a plurality of applications to use. The application and the service have a same basic structure. A difference lies in that the service can provide the public capability for a plurality of applications to share and use.

One business solution may include a plurality of applications or services. Each application has an application name, and each service has a service name.

For example, a business solution "video business" may include an application such as an "on-demand application", a "conference application", or a "short video application". In addition, the business solution "video business" may further include a service such as a "media stream service" or a "database service".

3. Component

The application or the service may include one or more components (represented by 1 to N in FIG. 2, where N is an integer greater than or equal to 1). The component is a relatively independent functional module in the application or the service, and includes a series of nodes of a same specification in a deployment form. For example, either a cluster including nodes of a same specification or a two-node cluster belongs to the component.

Each component in the application or the service has a component name and a quantity of component nodes. The quantity of component nodes is a quantity of nodes included in the component.

4. Software and a Specification of a Node Resource

In each component, a specification requirement on a computing resource, a storage resource, a network resource, or the like of one or more nodes in the component and one or more pieces of software (represented by 1 to N in FIG. 2, where N is an integer greater than or equal to 1) required to be deployed on the nodes need to be specified. For the software, a software name and a software version corresponding to the software need to be specified. A specification of the computing resource may include a quantity of cores of a CPU and a memory size. A specification of the storage resource may be a specification of a magnetic disk, the specification of the magnetic disk may include a quantity of magnetic disks, a name or a size of the magnetic disk, or whether the magnetic disk is shared. A specification of the network resource may include a quantity of network adapters, a name and traffic of each network adapter, a corresponding network plane, and the like.

In addition, the specification of the node resource may further include a specification of a virtual machine (VM) image. The VM image may also be used as a computing resource.

5. Software Dependency

Dependencies may exist between software deployed on different nodes in a same component. Therefore, the dependencies between the software may be described in the component.

6. Component Dependency

Dependencies may exist between a plurality of components in a same application or service. Therefore, the dependencies between the components may be described in the application or the service.

7. Service Usage Relationship

In an overall business solution, a relationship in which an application uses a service or a relationship in which a service uses a service may exist. Therefore, such usage relationships may be defined in the business solution, and are collectively referred to as the service usage relationship.

The application design represents an overall topology structure of a business. Therefore, if the operation target of the business is described by using the application design in this step, the application design represents an overall topology structure of a target business that the user expects to obtain, not merely data that needs to be changed. The user may adjust in advance information such as software and a topology based on an application design corresponding to currently running business data, to form a target application design. In subsequent steps, an operation task that needs to be executed to form the operation target may be obtained by comparing the target application design with an application design corresponding to current running data of the business.

S102: The cloud computing system determines, based on the operation target of the business and current running data of the business, an operation task that needs to be executed to implement the operation target of the business, where the current running data of the business includes a current topology of the business and currently running software.

Optionally, the cloud computing system may directly compare the operation target of the business with the current running data of the business. For example, the cloud computing system directly reads an application of a business running in the cloud computing system, and compares the application with the target application in the operation target of the business. Alternatively, the cloud computing system may export the current running data of the business to form the application design. The exported current running data of the business includes a topology instance, a running software instance, and the like. The topology instance includes an application instance, a service instance, and the like. The software instance refers to various types of software running in the business. Further, after the target application design and the application design corresponding to the current running data of the business are obtained, a difference item may be determined by comparing topologies and software information in the two application designs layer by layer, and the operation task that needs to be executed to implement the operation target of the business is generated based on the difference item.

There may be one or more generated operation tasks. The operation task may be, for example, adding an application, deleting an application, or upgrading software.

An example process is described in detail in the following embodiments.

S103: The cloud computing system determines dependencies between the operation tasks, and executes the operation tasks based on the dependencies between the operation tasks.

After the operation tasks that need to be executed to implement the operation target of the business are determined, the dependencies between the operation tasks need to be determined. For example, a service may be used by an application. Therefore, an operation task of deploying an application needs to depend on an operation task of deploying a service. Correspondingly, the operation task of deploying the service needs to be executed before the operation task of deploying the application is executed.

It should be noted that, if there is only one operation task that needs to be executed to implement the operation target of the business and that is determined in the foregoing step S102, no dependency between operation tasks needs to be determined, and the operation task can be directly executed.

In this embodiment, the operation task is automatically determined based on the operation target of the business. When there are a plurality of determined operation tasks, dependencies between the operation tasks may be automatically determined, and the operation tasks are further automatically executed in sequence based on the dependencies. In this way, automatic execution of a business maintenance operation is implemented, and efficiency of the business maintenance operation is greatly improved.

This embodiment provides a specific description for the foregoing step S102.

When the operation target is represented by using the application design, the foregoing operation target for each item may correspond to content of each item in the target application design. For example, the target application design may have a plurality of application items. One application item represents one target application. An application name of each application item, a component included in the application item, and the like respectively represent a name of a target application, a component included in the target application, and the like.

Figure 3:
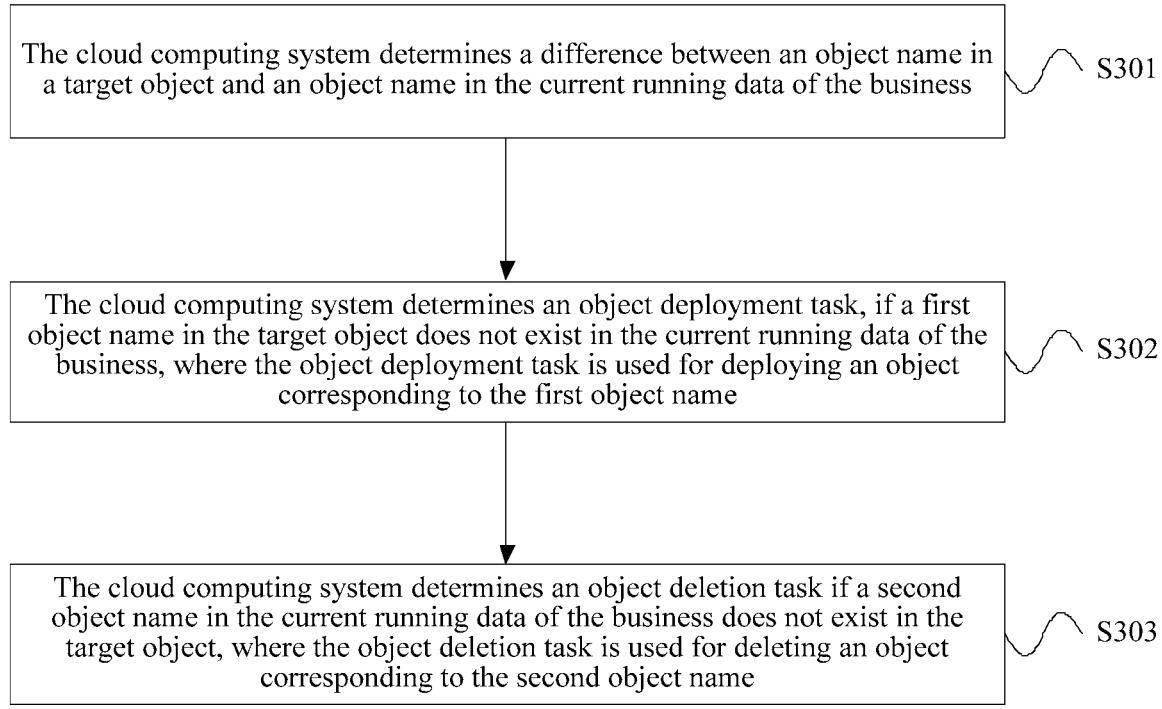
FIG. 3 is a schematic flowchart of a first method for determining an operation target in a business operation method embodiment according to an embodiment of the present invention.

FIG. 3 is a schematic flowchart of a first method for determining the operation target in the business operation method embodiment according to an embodiment of the present invention. As shown in FIG. 3, the first method for determining the operation target of the business includes the following steps.

S301: The cloud computing system determines a difference between an object name in a target object and an object name in the current running data of the business.

A process of step S301 to step S303 is applicable to a case in which the operation target is a target application, a target service, a target service usage relationship, or a target component. That is, the target object may be the target application, the target service, the target service usage relationship, or the target component, and the object name may be an application name, a service name, a service usage relationship name, or a component name.

An example in which the target object is the target application is used for describing an implementation process of the steps.

After receiving the target application design, the cloud computing system may compare whether application names in the target application design are the same as application names in the application design corresponding to the current running data of the business one by one, and record a difference between the two application designs in a comparison process.

For example, it is assumed that there are three applications with names of AA, BB, and CC respectively in the target application design, and there are three applications with names of BB, CC, and DD respectively in the application design corresponding to the current running data of the business. It can be learned through comparison that, the applications BB and CC exist in both the target application design and the application design corresponding to the current running data of the business, AA exists merely in the target application design, and DD exists merely in the application design corresponding to the current running data of the business.

In the foregoing example, the two applications BB and CC exist in both of the two application designs. Therefore, BB and CC do not belong to the difference between the two application designs, and AA and DD belong to the difference between the two application designs.

S302: The cloud computing system determines an object deployment task if a first object name in the target object does not exist in the current running data of the business, where the object deployment task is used for deploying an object corresponding to the first object name.

The example in step S301 is still used. In the difference between the target application design and the application design corresponding to the current running data of the business, the application AA in the target application design does not exist in the current running data of the business. Therefore, the application AA satisfies the condition in this step. That is, the application AA is an added application. Therefore, the cloud computing system may determine an application deployment task, and the application deployment task is used for deploying the application AA.

By analogy, if the target object is the target service, a service deployment task is determined in this step to deploy a new service; if the target object is the target service usage relationship, a service usage relationship deployment task is determined to deploy a new service usage relationship; if the target object is the target component, a component deployment task is determined to deploy a new component.

S303: The cloud computing system determines an object deletion task if a second object name in the current running data of the business does not exist in the target object, where the object deletion task is used for deleting an object corresponding to the second object name.

The example in step S301 is still used. In the difference between the target application design and the application design corresponding to the current running data of the business, the application DD in the current running data of the business does not exist in the target application design. Therefore, the application DD satisfies the condition in this step. That is, the application DD is an application to be deleted. Therefore, the cloud computing system may determine an application deletion task, and the application deletion task is used for deleting the application DD.

By analogy, if the target object is the target service, a service deletion task is determined in this step to delete a service; if the target object is the target service usage relationship, a service usage relationship deletion task is determined to delete a service usage relationship; if the target object is the target component, a component deletion task is determined to delete a component.

Figure 4:
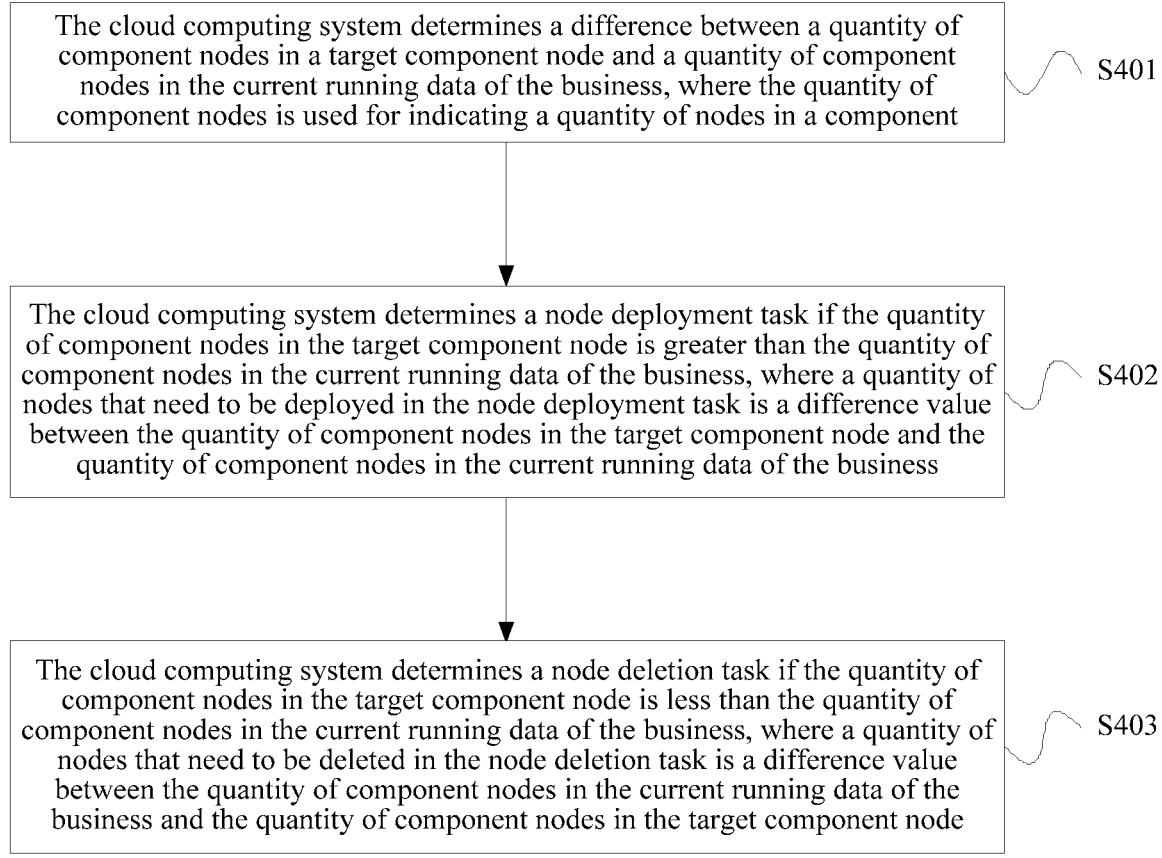
FIG. 4 is a schematic flowchart of a second method for determining an operation target in a business operation method embodiment according to an embodiment of the present invention.

FIG. 4 is a schematic flowchart of a second method for determining the operation target in the business operation method embodiment according to an embodiment of the present invention. As shown in FIG. 4, the second method for determining the operation target of the business includes the following steps.

S401: The cloud computing system determines a difference between a quantity of component nodes in a target component node and a quantity of component nodes in the current running data of the business, where the quantity of component nodes is used for indicating a quantity of nodes in a component.

The second method is applicable to a case in which the operation target is the target component node. That is, a quantity of component nodes in the target application design is compared with a quantity of component nodes in the application design corresponding to the current running data of the business, and a corresponding operation task is determined.

It should be noted that, in this process, comparison is performed on nodes in a same component in the target application design and the application design corresponding to the current running data of the business.

For example, the target application design has an application A, the application A includes a component A1, a quantity of component nodes in the component A1 is 10, and a quantity of component nodes in the component A1 in the application A in the application design corresponding to the current running data of the business is 12. In this case, it is determined that a difference exists between the quantities of component nodes in the same component A1 in the two application designs.

S402: The cloud computing system determines a node deployment task if the quantity of component nodes in the target component node is greater than the quantity of component nodes in the current running data of the business, where a quantity of nodes that need to be deployed in the node deployment task is a difference value between the quantity of component nodes in the target component node and the quantity of component nodes in the current running data of the business.

If the quantity of component nodes in the target component node is greater than the quantity of component nodes in the current running data of the business, it indicates that a quantity of nodes in a target topology increases. Therefore, the node deployment task needs to be determined. To be specific, a particular quantity of nodes are added to a particular component in the current business. A specification of the nodes is the same as a specification of other nodes in the particular component. In addition, the quantity of the added nodes is the difference value between the quantity of component nodes in the target component node and the quantity of component nodes in the current running data of the business.

S403: The cloud computing system determines a node deletion task if the quantity of component nodes in the target component node is less than the quantity of component nodes in the current running data of the business, where a quantity of nodes that need to be deleted in the node deletion task is a difference value between the quantity of component nodes in the current running data of the business and the quantity of component nodes in the target component node.

If the quantity of component nodes in the target component node is less than the quantity of component nodes in the current running data of the business, it indicates that a quantity of nodes in the component needs to be decreased. Therefore, the node deletion task needs to be determined. To be specific, a particular quantity of nodes are deleted from a particular component in the current business, and the quantity of the nodes that need to be deleted is the difference value between the quantity of component nodes in the current running data of the business and the quantity of component nodes in the target component node.

Figure 5:
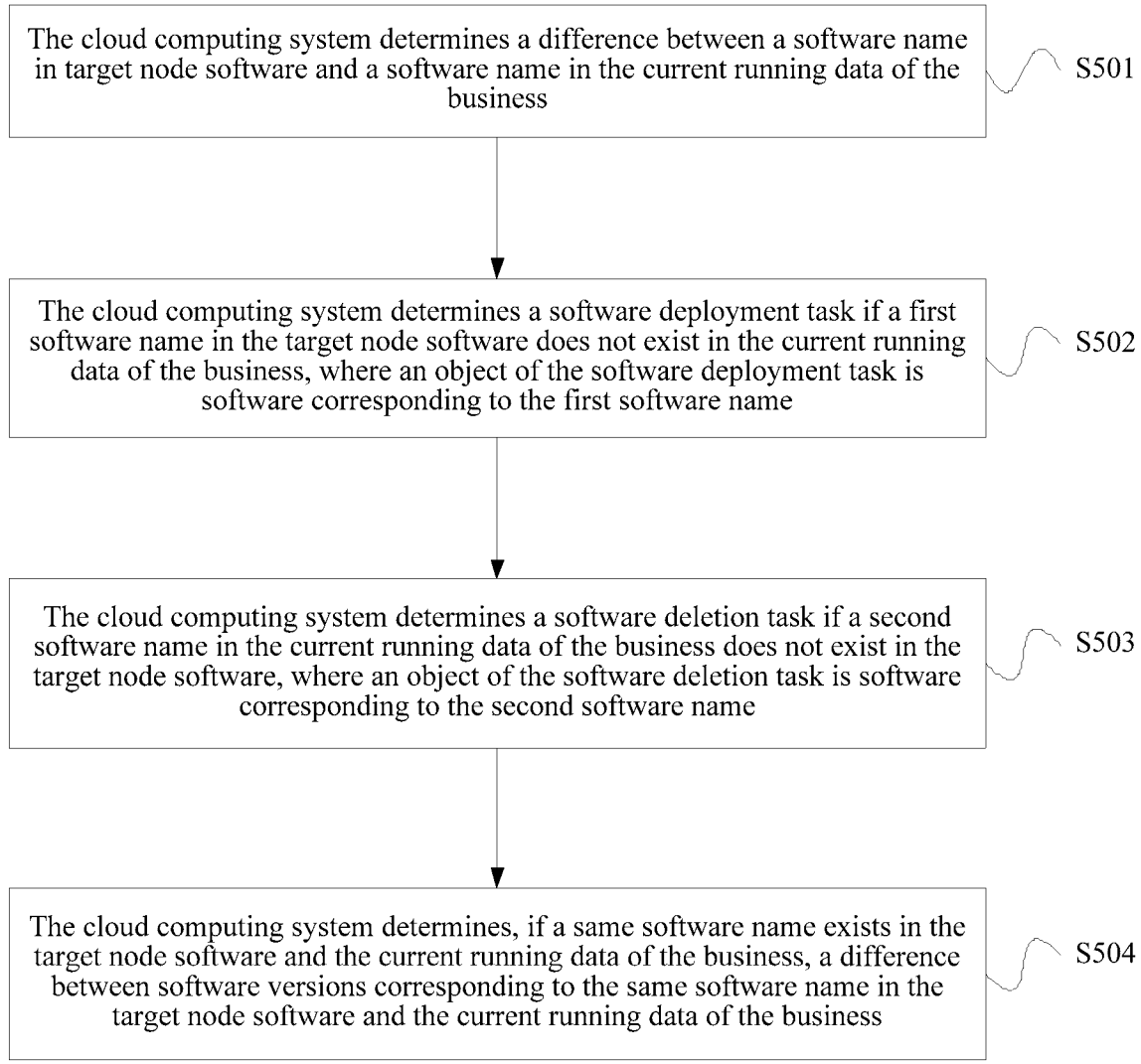
FIG. 5 is a schematic flowchart of a third method for determining an operation target in a business operation method embodiment according to an embodiment of the present invention.

FIG. 5 is a schematic flowchart of a third method for determining the operation target in the business operation method embodiment according to an embodiment of the present invention. As shown in FIG. 5, the third method for determining the operation target of the business includes the following steps.

S501: The cloud computing system determines a difference between a software name in target node software and a software name in the current running data of the business.

The third method is applicable to a case in which the operation target is the target node software. That is, comparison is performed on software in a same component in the target application design and the application design corresponding to the current running data of the business.

There may be a plurality of pieces of software in a same component, and each piece of software has a software name and a software version. In this step, comparison may be performed on names of the plurality of pieces of software in the same component to obtain a difference between the software names.

S502: The cloud computing system determines a software deployment task if a first software name in the target node software does not exist in the current running data of the business, where an object of the software deployment task is software corresponding to the first software name.

If a software name exists in the target node software but does not exist in the current running data of the business, it indicates that software corresponding to the software name is added software, and the software deployment task needs to be determined.

S503: The cloud computing system determines a software deletion task if a second software name in the current running data of the business does not exist in the target node software, where an object of the software deletion task is software corresponding to the second software name.

If a software name exists in the current running data of the business but does not exist in the target node software, it indicates that the software is no longer needed in the business. Therefore, the software deletion task needs to be determined.

S504: The cloud computing system determines, if a same software name exists in the target node software and the current running data of the business, a difference between software versions corresponding to the same software name in the target node software and the current running data of the business.

If a software name exists in both the target node software and the current running data of the business, it indicates that a target business needs software corresponding to the software name. Therefore, whether software upgrading needs to be performed is further determined by determining a difference between software versions.

In some embodiments, comparison is performed between versions of software having a same software name in the target node software and the current running data of the business. If the software versions are the same, it indicates that the software does not change, and an operation task does not need to be generated. If the software versions corresponding to the same software name in the target node software and the current running data of the business are different, a software upgrading task is determined. That is, the software is upgraded from the version in the current running data of the business to the version in the target node software.

Figure 6:
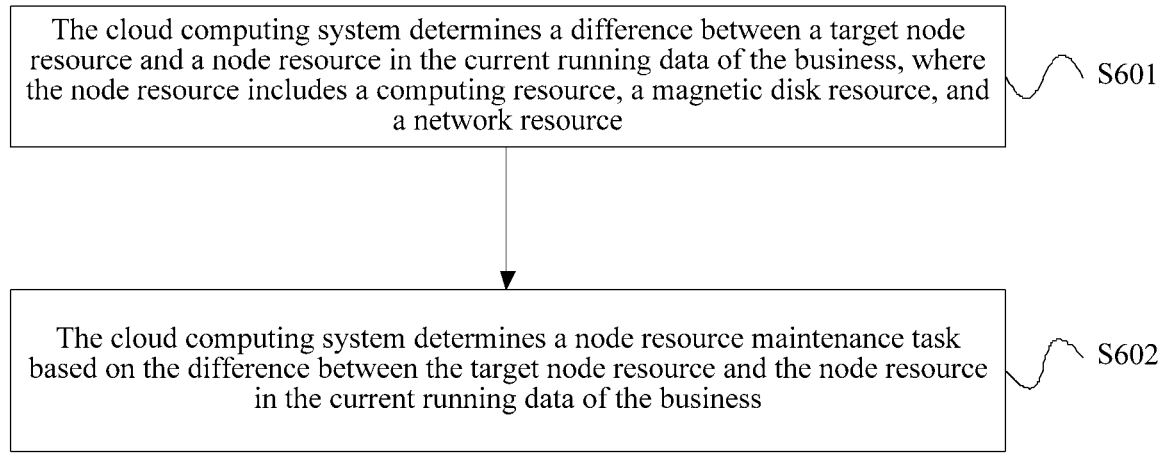
FIG. 6 is a schematic flowchart of a fourth method for determining an operation target in a business operation method embodiment according to an embodiment of the present invention.

FIG. 6 is a schematic flowchart of a fourth method for determining the operation target in the business operation method embodiment according to an embodiment of the present invention. As shown in FIG. 6, the fourth method for determining the operation target of the business includes the following steps.

S601: The cloud computing system determines a difference between a target node resource and a node resource in the current running data of the business, where the node resource includes a computing resource, a magnetic disk resource, and a network resource.

The fourth method is applicable to a case in which the operation target is the target node resource. That is, comparison is performed between node resources in a same component in the target application design and the application design corresponding to the current running data of the business.

A node resource in a component may be used for specifying a requirement on specifications of a computing resource, a magnetic disk resource, and a network resource of a node. In addition, a requirement on a specification of a VM image may also be included.

S602: The cloud computing system determines a node resource maintenance task based on the difference between the target node resource and the node resource in the current running data of the business.

Descriptions are provided below for different node resources separately.

1. Computing Resource

The cloud computing system may compare computing resources in a same component in the target application design and the application design corresponding to the current running data of the business. If a specification of a computing resource changes, an operation task of changing the specification of the computing resource is created for each node in the component. In addition, the change of the specification of the computing resource takes effect only after the node is restarted. Therefore, an operation task of restarting the node further needs to be created for each node in the component.

2. Magnetic Disk Resource

The cloud computing system may compare magnetic disk resources in a same component in the target application design and the application design corresponding to the current running data of the business. If a new magnetic disk name appears in the target application design and a magnetic disk is shared, an operation task of adding a magnetic disk resource is created, and then an operation task of mounting the magnetic disk is created for each node in the component. If a new magnetic disk name appears in the target application design and a magnetic disk is not shared, an operation task of adding a magnetic disk resource and an operation task of mounting the magnetic disk are created for each node in the component. If a magnetic disk name in the application design corresponding to the current running data of the business, that is, an original magnetic disk name, does not exist in the target application design, and an original magnetic disk is shared, an operation task of unmounting the magnetic disk is created for each node in the component, and then an operation task of deleting the magnetic disk is created. If a magnetic disk name in the application design corresponding to the current running data of the business, that is, an original magnetic disk name, does not exist in the target application design, and an original magnetic disk is not shared, an operation task of unmounting the magnetic disk and an operation task of deleting the magnetic disk are created for each node in the component. If a specification of a magnetic disk changes and the magnetic disk is shared, an operation task of changing the specification of the magnetic disk is created for the magnetic disk. If a specification of a magnetic disk changes and the magnetic disk is not shared, an operation task of changing the specification of the magnetic disk is created for each node in the component. If an operating system corresponding to a magnetic disk can make a change of the magnetic disk to take effect only after restarting a node, an operation task of restarting the node further needs to be created for each node in the component.

3. Network Resource

The cloud computing system may compare network resources in a same component in the target application design and the application design corresponding to the current running data of the business. If a new network adapter name appears in the target application design, an operation task of adding a network adapter is created for each node in the component. If a network adapter name in the current running data of the business, that is, an original network adapter name, does not exist in the target application design, an operation task of deleting a network adapter is created for each node in the component. If traffic of a network adapter and a network plane change, an operation task of changing a specification of the network adapter is created for each node in the component. If an operating system corresponding to a network resource can make the network resource to take effect only after restarting a node, an operation task of restarting the node further needs to be created for each node in the component.

4. VM Image Resource

The cloud computing system may compare VM image resources in a same component in the target application design and the application design corresponding to the current running data of the business. If a new VM image appears in the target application design, an operation task of adding a node and an operation task of deleting a node need to be created. Specifically, a computing resource is requested from IaaS by using an image parameter in the new VM image. A quantity of computing resources that need to be requested is equal to a quantity of nodes running in the component in the current running data. Further, business software is deployed on the computing resource and is added to a business cluster. Further, all original nodes in the component are deleted.

Figure 7:
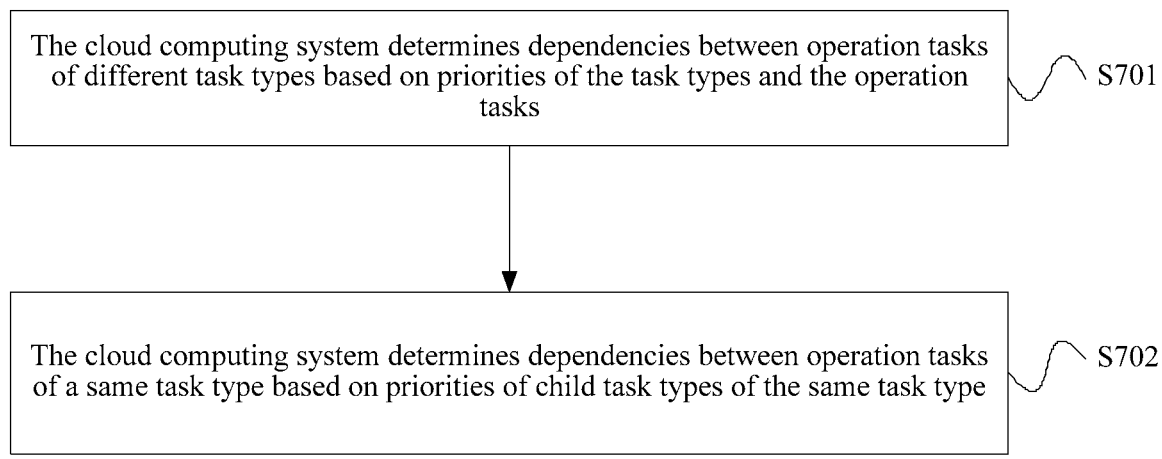
FIG. 7 is a first schematic flowchart of determining dependencies in a business operation method embodiment according to an embodiment of the present invention.

FIG. 7 is a first schematic flowchart of determining dependencies in the business operation method embodiment according to an embodiment of the present invention. As shown in FIG. 7, a specific process of determining the dependencies between the operation tasks in the foregoing step S103 is as follows.

S701: The cloud computing system determines dependencies between operation tasks of different task types based on priorities of the task types and the operation tasks.

The task types include a deployment type, a changing type, and a deletion type. A priority of the deployment type is higher than a priority of the changing type, and the priority of the changing type is higher than a priority of the deletion type.

It can be learned from the foregoing embodiments that, after the target application design is compared with the application design corresponding to the current running data of the business, a plurality of operation tasks of different task types may be determined. The task type may be the deployment type, the changing type, or the deletion type. The application deployment, the service deployment, the service usage relationship deployment, the component deployment, the node deployment, the software deployment, the magnetic disk resource adding, and the network adapter adding in the foregoing embodiments belong to operation tasks of the deployment type. The software upgrading, the computing resource specification changing, and the network adapter specification changing in the foregoing embodiments belong to operation tasks of the changing type. The application deletion, the service deletion, the service usage relationship deletion, the component deletion, the node deletion, the software deletion, the magnetic disk deletion, and the network adapter deletion in the foregoing embodiments belong to operation tasks of the deletion type.

In the operations tasks, a deployment operation does not affect running of an existing topology object of the business. A newly deployed topology object may be used when the existing topology object changes. Therefore, topology object deployment is scheduled and performed before the existing topology object changes. A topology object to be deleted does not participate in running of the business after the existing topology object changes. Therefore, a deletion operation task is executed after the changing operation.

Therefore, after the cloud computing system determines a plurality of operation tasks, dependencies between the operation tasks of different task types may be first determined based on the foregoing analysis result. For example, it is assumed that the operation tasks determined in the foregoing embodiments include deleting an application A, upgrading software B, deploying a component C, and deploying a component D. First, it is determined, based on the dependencies between the operation tasks of the different task types, that the software B is upgraded before the application A is deleted, and that the component C and the component D are deployed before the software B is upgraded. A dependency between deploying the component C and deploying the component D is determined in the following step.

S702: The cloud computing system determines dependencies between operation tasks of a same task type based on priorities of child task types of the same task type.

Relationships between operation tasks of a same task type need to be determined based on properties of the operation tasks of the same task type. Methods for determining dependencies between the operation tasks of the deployment type, the operation tasks of the changing type, and the operation tasks of the deletion type are separately described below.

Figure 8A:
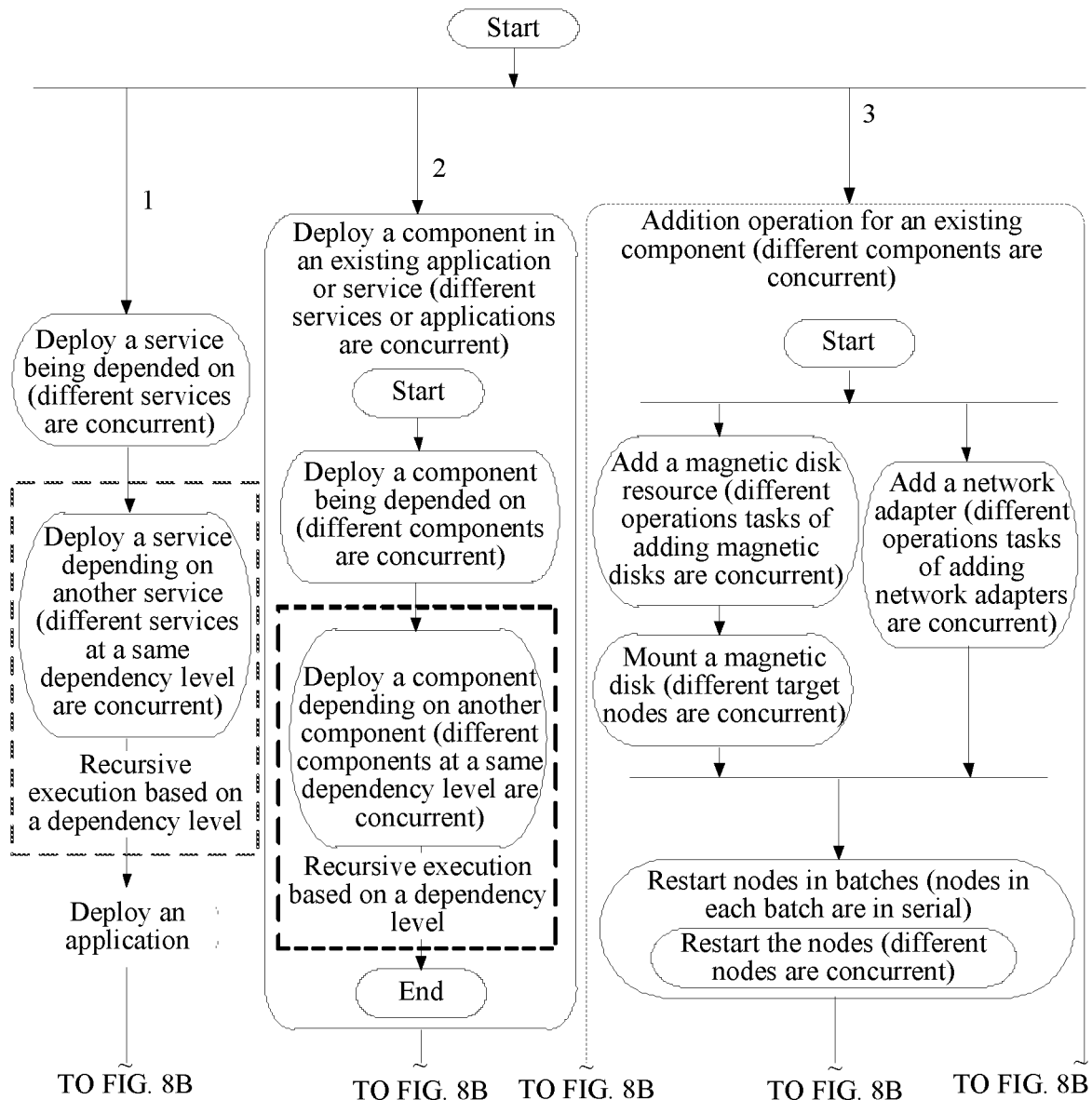
FIG. 8A and FIG. 8B are a second schematic diagram of determining dependencies between tasks of a deployment type in a business operation method embodiment according to an embodiment of the present invention.
Figure 8B:
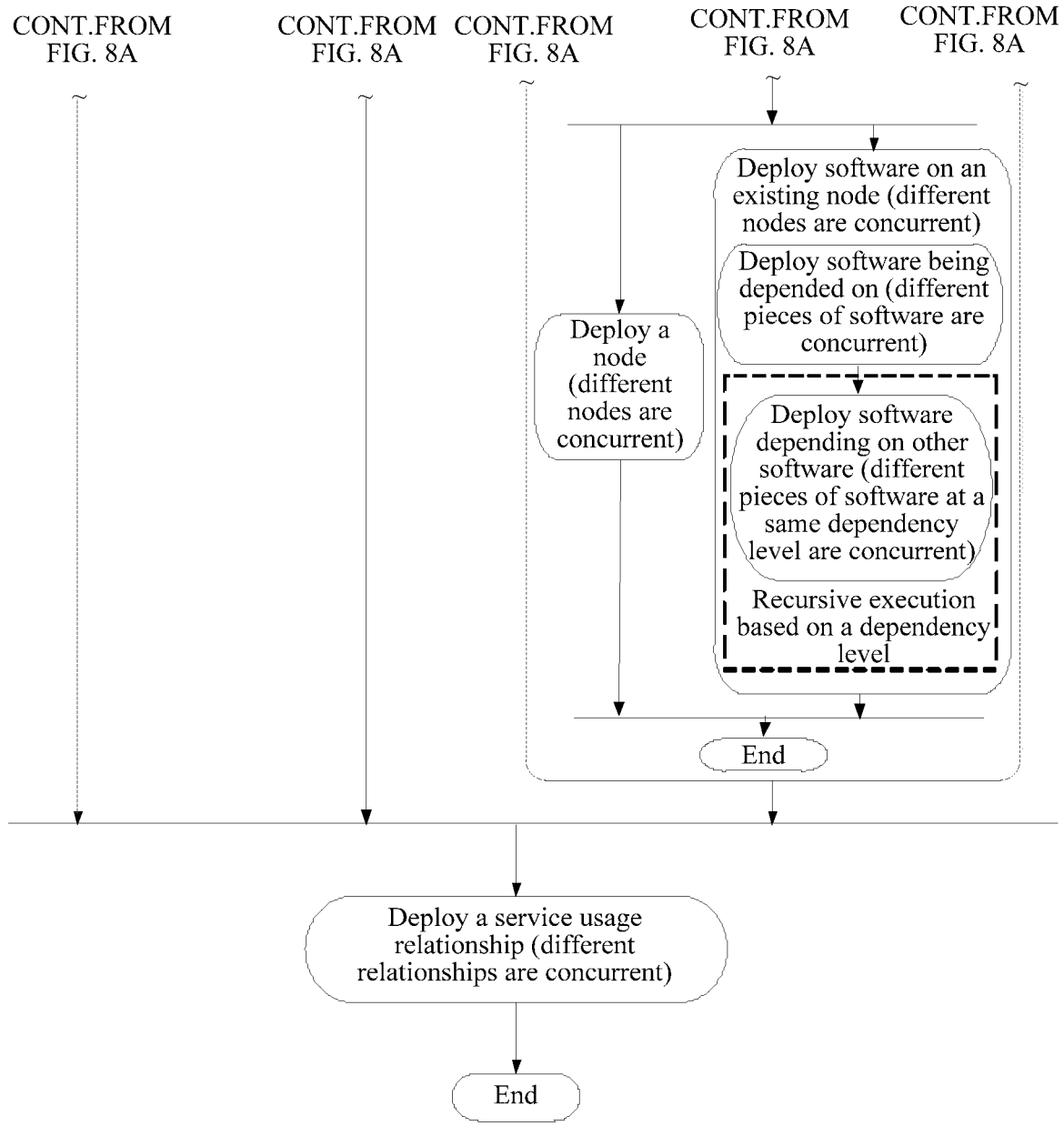

Determine the dependencies between the operation tasks of the deployment type:

FIG. 8A and FIG. 8B are a second schematic diagram of determining dependencies between tasks of a deployment type in the business operation method embodiment according to an embodiment of the present invention. As shown in FIG. 8A and FIG. 8B, the dependencies between the operation tasks of the deployment type may be summarized as the following 11 points. It should be noted that, items arranged in parallel in FIG. 8A and FIG. 8B indicate that dependencies do not exist between the operation tasks and the operation tasks may be concurrently executed. For example, operation tasks corresponding to line 1 may be concurrently executed with operation tasks corresponding to line 2 in FIG. 8A and FIG. 8B. Similarly, the operation tasks corresponding to line 2 may be concurrently executed with operation tasks corresponding to line 3, and the operation tasks corresponding to line 1 may also be concurrently executed with the operation tasks corresponding to line 3. That is, the operation tasks corresponding to line 1, line 2, and line 3 are independent of each other, have no dependency, and may be concurrently executed. However, apparently, dependencies exist between operation tasks along line 1.

1. Because a service may be used by an application, an operation task of deploying the service needs to be executed before an operation task of deploying the application is executed.

2. Because a scenario in which a service uses another service may exist, a task of deploying a service used by another service needs to be first executed, and no usage relationship exists between used services. Therefore, operation tasks of deploying the used services may be concurrently executed. After deployment of the used services is completed, operation tasks of deploying services that use the services are then executed. No usage relationship exists between the services that use other services. Therefore, operation tasks of deploying the services that use other services may be concurrently executed.

3. The operation task of deploying the application is executed after the operation task of deploying the service is executed, and no usage relationship exists between various applications. Therefore, operation tasks of deploying the applications may be concurrently executed.

The foregoing three points correspond to the dependencies between the operation tasks along line 1 in FIG. 8A and FIG. 8B.

4. Operation tasks of deploying components in existing applications or existing services are independent of each other for each application or service. Therefore, operation tasks of deploying components in each target application or target service may be concurrently executed.

Dependencies between components exist in a same application or service. Therefore, in each operation task of deploying the components in the same application or service, based on a component usage relationship, a component being depended on needs to be first deployed, and a component depending on another component is then deployed. No dependency exists between components deployed in a same batch, and deployment operations may be concurrently performed.

The foregoing point corresponds to the dependencies between the operation tasks along line 2 in FIG. 8A and FIG. 8B.

5. Because an added node or added software may use an added resource, an operation task of adding a resource independent of each node in a component (such as adding a magnetic disk resource) is executed before an operation task of deploying software or a node is executed.

6. In an operation task of adding a magnetic disk, an operation task of adding a magnetic disk resource is first executed, and an operation task of mounting the added magnetic disk on a target node is then executed. A plurality of operation tasks of adding a magnetic disk resource may be concurrently executed, and a plurality of operation tasks of mounting a magnetic disk may also be concurrently executed. Magnetic disk mounting can take effect only after a node operating system is restarted. Therefore, after magnetic disk mounting is completed, an operation task of restarting a node needs to be executed for the node on which the magnetic disk is mounted. To ensure that a magnetic disk mounting operation does not interrupt execution of the business, nodes in a component may be classified into a plurality of batches to separately perform a restarting operation. A restarting child task is created for each batch, and restarting child tasks for nodes in a same batch may be concurrently executed. Division of the batches may be flexibly set according to a requirement. For example, the nodes may be classified into two batches. For a two-node component, two restarting child tasks may be respectively created for a standby node and an active node in the component.

7. An operation task of deploying a node in an existing component is executed after an operation task of adding an independent resource is executed, and operation tasks of deploying a node in various components may be concurrently executed.

8. Because added software usually uses an added resource, an operation task of adding a resource to an existing node (such as adding a network adapter) is executed before an operation task of deploying software is executed.

9. Operation tasks of adding a network adapter that are on a plurality of nodes may be concurrently executed. Adding network adapter also takes effect after an operating system is restarted. To ensure that a network adapter adding operation does not interrupt execution of the business, nodes in a component may be classified into a plurality of batches to separately perform a restarting operation. A restarting child task is created for each batch, and restarting child tasks for nodes in a same batch may be concurrently executed. Division of the batches may be flexibly set according to a requirement. For example, the nodes may be classified into two batches. Two restarting child tasks are respectively created for a standby node and an active node for nodes in a two-node component. Restarting child tasks for nodes in a same batch may be concurrently executed.

10. An operation task of deploying software on an existing node is executed after an operation task of adding a node resource is executed, so that newly deployed software can use changed resource data. Operation tasks of deploying software on different nodes may be concurrently executed. Operation tasks of deploying software on a same node need to be executed in sequence based on a software usage relationship: software being depended on is first deployed and software depending on other software is then deployed. Software deployment tasks in a same batch may be concurrently executed.

The foregoing six points correspond to the dependencies between the operation tasks along line 3 in FIG. 8A and FIG. 8B.

11. An operation task of deploying a service usage relationship is finally executed, so that software may use a latest resource and software data to process a newly deployed service usage relationship. A plurality of operation tasks of deploying a service usage relationship may be concurrently executed.

The foregoing point corresponds to the dependencies between the operation tasks along line 4 in FIG. 8A and FIG. 8B.

In addition, in the foregoing points, a restarting task may be executed for a time after a related resource creation task is executed, to take effect for a plurality of added resources.

In addition, the operation of deploying the application or deploying the service may be concurrently executed with other operation tasks than the operation task of deploying the service usage relationship. The operation task of deploying the service usage relationship needs to be executed after all operation tasks of deploying the application, deploying the service, deploying the node, and deploying the software are executed.

In addition, in the operation tasks of the deployment type, operation tasks of adding a node and deploying software caused by a change in a specification of a VM image resource in each component may be concurrently executed.

Figure 9:
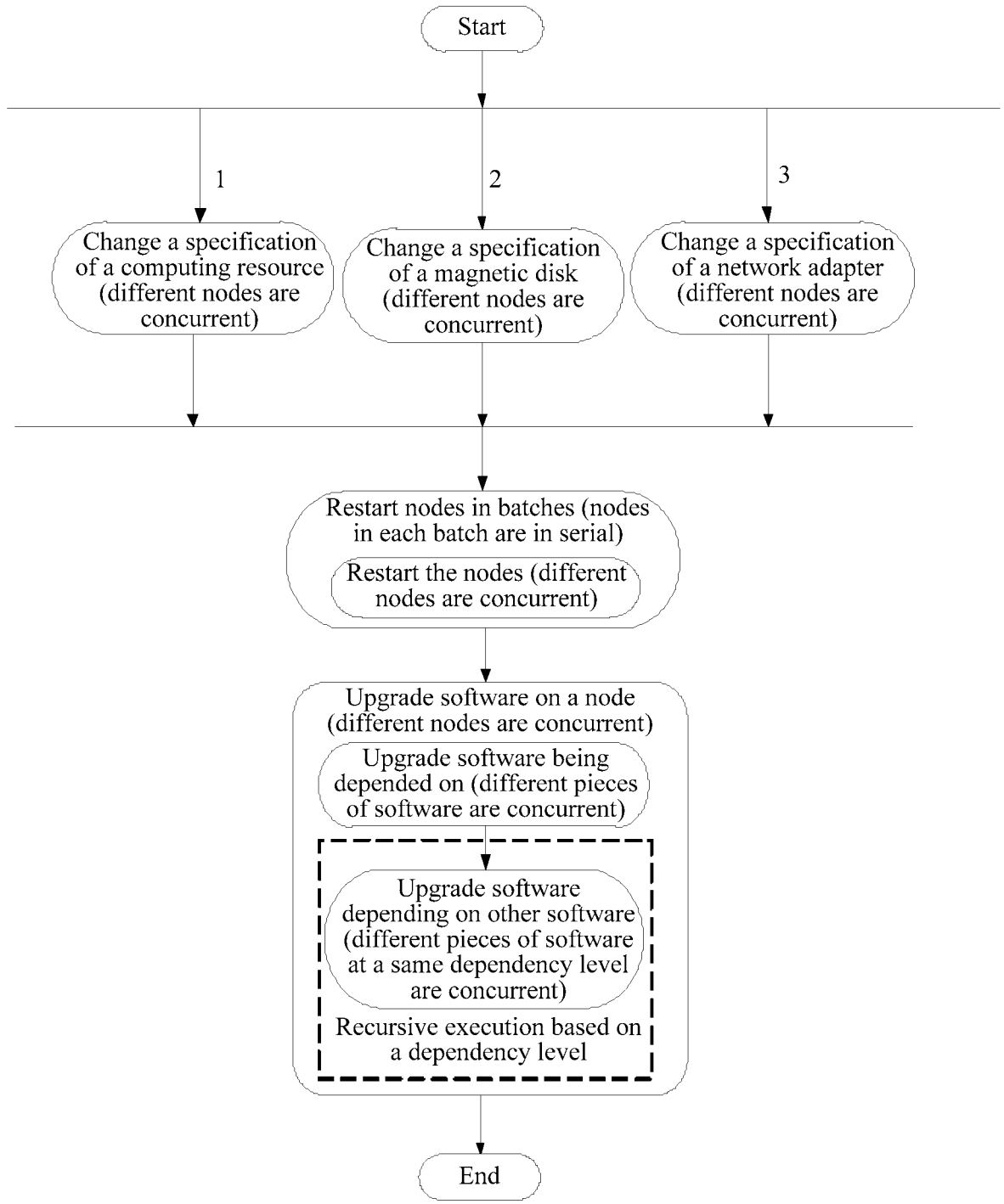
FIG. 9 is a third schematic diagram of determining dependencies between tasks of a changing type in a business operation method embodiment according to an embodiment of the present invention.

Determine the dependencies between the operation tasks of the changing type:

FIG. 9 is a third schematic diagram of determining dependencies between tasks of a changing type in the business operation method embodiment according to an embodiment of the present invention. As shown in FIG. 9, the dependencies between the operation tasks of the changing type may be summarized as the following five points. It should be noted that, items arranged in parallel in FIG. 9 indicate that dependencies do not exist between the operation tasks and the operation tasks may be concurrently executed. For example, operation tasks corresponding to line 1 may be concurrently executed with operation tasks corresponding to line 2 in FIG. 9. Similarly, the operation tasks corresponding to line 2 may be concurrently executed with operation tasks corresponding to line 3, and the operation tasks corresponding to line 1 may also be concurrently executed with the operation tasks corresponding to line 3. That is, the operation tasks corresponding to line 1, line 2, and line 3 are independent of each other, have no dependency, and may be concurrently executed.

1. An operation task of changing a resource includes changing a specification of a computing resource, changing a specification of a magnetic disk, and changing a specification of a network adapter, and is executed before an operation task of upgrading software is executed, to ensure that the upgraded software can use latest resource data.

2. The specification of the computing resource, the specification of the magnetic disk, and the specification of the network adapter for each node may be concurrently changed, and these operations do not affect each other. That is, operations corresponding to line 1, line 2, and line 3 in FIG. 9 may be concurrently performed 3. For some operating systems, because the change of the resource specification takes effect after the operating system is restarted, a restarting operation needs to be performed after the foregoing tasks are executed. To ensure that the business is not interrupted, nodes in a component may be classified into a plurality of batches to separately perform a restarting operation. A restarting child task is created for each batch, and restarting child tasks for nodes in a same batch may be concurrently executed. Division of the batches may be flexibly set according to a requirement. For example, the nodes may be classified into two batches. Two restarting child tasks are respectively created for a standby node and an active node for nodes in a two-node component. Restarting child tasks for nodes in a same batch may be concurrently executed.

4. A software upgrading task is executed after the change of the resource specification is completed. To ensure that a software upgrading operation does not interrupt execution of the business, nodes in a component may be classified into a plurality of batches to separately perform an upgrading operation. A restarting child task is created for each batch, and upgrading child tasks for nodes in a same batch may be concurrently executed. Division of the batches may be flexibly set according to a requirement. For example, the nodes may be classified into two batches. Two upgrading child tasks are respectively created for a standby node and an active node for nodes in a two-node component. Upgrading child tasks in a same batch may be concurrently executed.

5. For operation tasks of upgrading software on a same node, a scheduling order is determined based on software dependencies. Software being depended on is first upgraded and software depending on other software is then upgraded. Software upgrading in a same batch may be concurrently executed.

Figure 10A:
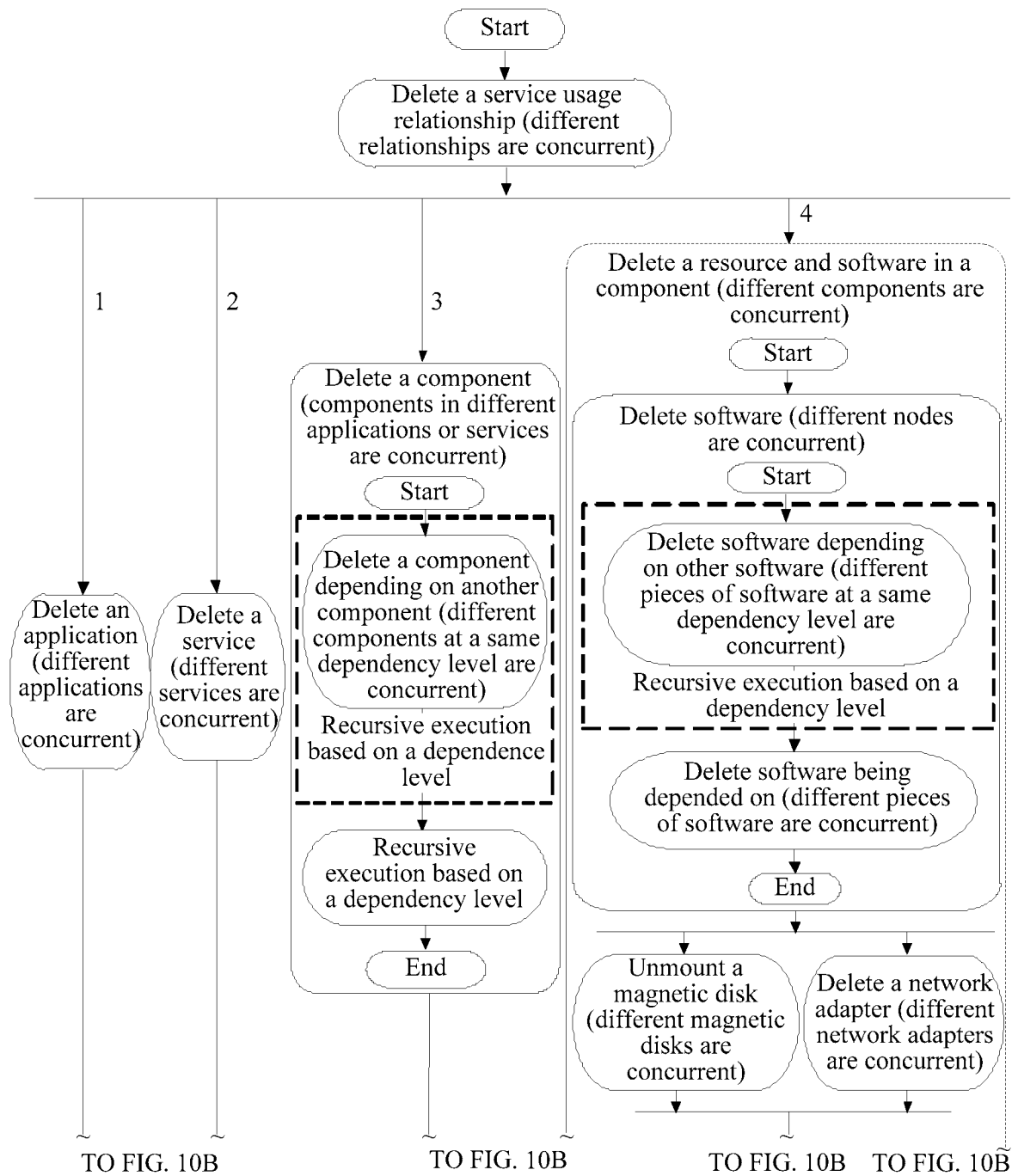
FIG. 10A and FIG. 10B are a fourth schematic diagram of determining dependencies between tasks of a deletion type in a business operation method embodiment according to an embodiment of the present invention.
Figure 10B:
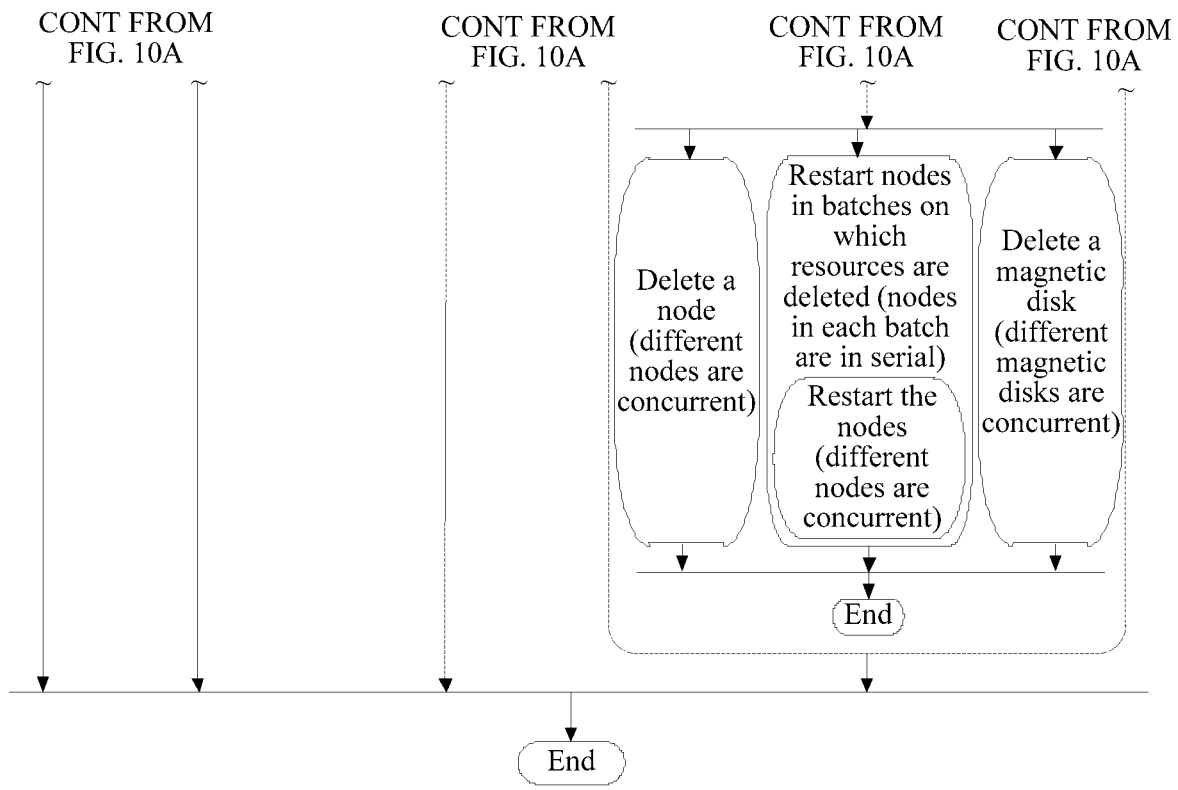

Determine the dependencies between the operation tasks of the deletion type:

FIG. 10A and FIG. 10B are a fourth schematic diagram of determining dependencies between tasks of a deletion type in the business operation method embodiment according to an embodiment of the present invention. As shown in FIG. 10A and FIG. 10B, the dependencies between the operation tasks of the deletion type may be summarized as the following eight points. It should be noted that, items arranged in parallel in FIG. 10A and FIG. 10B indicate that dependencies do not exist between the operation tasks and the operation tasks may be concurrently executed. For example, operation tasks corresponding to line 1 may be concurrently executed with operation tasks corresponding to line 2 in FIG. 10A and FIG. 10B. Similarly, the operation tasks corresponding to line 2 may be concurrently executed with operation tasks corresponding to line 3, and the operation tasks corresponding to line 3 may be concurrently executed with operation tasks corresponding to line 4. That is, the operation tasks corresponding to line 1, line 2, line 3, and line 4 are independent of each other, have no dependency, and may be concurrently executed.

1. An operation task of deleting a service usage relationship is first executed. After the service usage relationship is deleted, both a service and a service user can independently perform a subsequent deletion operation without affecting each other. A plurality of service usage relationship deletion tasks may be concurrently executed.

2. After the service usage relationship is deleted, operation tasks of deleting an application, deleting a service, deleting a component, and deleting a component node, that is, the operation tasks respectively corresponding to line 1 to line 4 in FIG. 10A and FIG. 10B, may be concurrently executed.

3. Operation tasks of deleting components in different applications or services may be concurrently executed. In a same application or service, a component depending on another component is first deleted, and the component being depended on is then deleted. Operation tasks of deleting components in a same batch may be concurrently executed.

4. For operation tasks of deleting a resource and software executed for an existing node, the operation task of deleting the software is first executed, and the operation task of deleting the resource is then executed, to ensure that no usage relationship exists between any software and the resource when the resource is deleted.

5. Operation tasks of deleting software on different nodes may be concurrently executed. Operation tasks of deleting software on a same node may be executed in sequence based on software dependencies. That is, software depending on other software is first deleted, and the software being depended on is then deleted. Operation tasks of deleting software in a same batch may be concurrently executed.

6. For an operation task of deleting a magnetic disk, a magnetic disk unmounting task needs to be first executed for a node, and a magnetic disk deletion task is then executed. Magnetic disk unmounting tasks may be concurrently executed, and magnetic disk deletion tasks may be concurrently executed.

Magnetic disk mounting can take effect only after a node operating system is restarted. Therefore, after magnetic disk unmounting is completed, a restarting operation needs to be performed on a node from which the magnetic disk is unmounted. To ensure that a magnetic disk unmounting operation does not interrupt execution of the business, nodes in a component may be classified into a plurality of batches to separately perform a restarting operation. A restarting child task is created for each batch, and restarting child tasks for nodes in a same batch may be concurrently executed. Division of the batches may be flexibly set according to a requirement. For example, the nodes may be classified into two batches. Two restarting child tasks are respectively created for a standby node and an active node for nodes in a two-node component. Restarting child tasks for nodes in a same batch may be concurrently executed.

7. Operation tasks of deleting network adapters between nodes and in each node may be concurrently executed. Network adapter deletion also takes effect after an operating system is restarted. To ensure that a network adapter deletion operation does not interrupt execution of the business, nodes in a component may be classified into a plurality of batches to separately perform a restarting operation. A restarting child task is created for each batch, and restarting child tasks for nodes in a same batch may be concurrently executed. Division of the batches may be flexibly set according to a requirement. For example, the nodes may be classified into two batches. Two restarting child tasks are respectively created for a standby node and an active node for nodes in a two-node component. Restarting child tasks for nodes in a same batch may be concurrently executed.

8. Restarting operations performed after the magnetic disk unmounting and the network adapter unmounting may be performed in batches after the magnetic disk and the network adapter are deleted. Unmounting of a plurality of network adapters and magnetic disks simultaneously takes effect.

In addition, in the operation tasks of the deletion type, operation tasks of unmounting software and deleting a node caused by a change in a specification of a VM image resource in each component may be concurrently executed.

For the specific operation tasks determined in the foregoing embodiments, dependencies between the operation tasks may be automatically determined based on the foregoing step S701 and orders in FIG. 8A to FIG. 10B. Further, the operation tasks are automatically executed based on the dependencies between the operation tasks.

Figure 11:
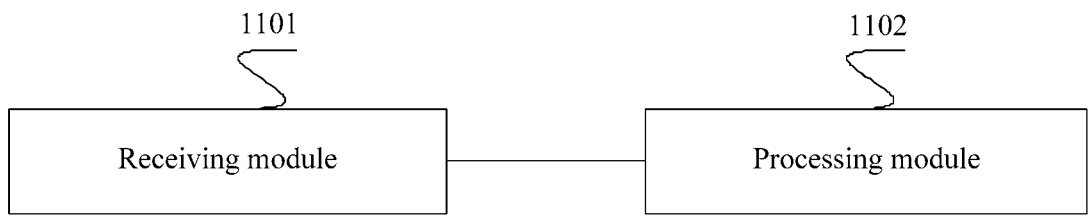
FIG. 11 is a modular structural diagram of a business operation apparatus according to an embodiment of the present invention.

FIG. 11 is a modular structural diagram of a business operation apparatus according to an embodiment of the present invention. As shown in FIG. 11, the apparatus includes:

a receiving module 1101, configured to receive an operation target of a business, where the operation target of the business is used for indicating a target topology and/or target software of the business; and a processing module 1102, configured to determine, based on the operation target of the business and current running data of the business, an operation task that needs to be executed to implement the operation target of the business, where the current running data of the business includes a current topology of the business and currently running software.

The processing module 1102 is further configured to: when there are a plurality of operation tasks, determine dependencies between the operation tasks, and execute the operation tasks based on the dependencies between the operation tasks.

The apparatus is configured to implement the foregoing method embodiments. Their implementation principles and technical effects are similar, and are not described herein again.

In another embodiment, the operation target of the business includes a target application, a target service, a target service usage relationship, and a target component. Correspondingly, the processing module 1102 is specifically configured to:

determine a difference between an object name in a target object and an object name in the current running data of the business; determine an object deployment task if a first object name in the target object does not exist in the current running data of the business, where the object deployment task is used for deploying an object corresponding to the first object name; and determine an object deletion task if a second object name in the current running data of the business does not exist in the target object, where the object deletion task is used for deleting an object corresponding to the second object name.

The target object is the target application, the target service, the target service usage relationship, or the target component, and the object name is an application name, a service name, a service usage relationship name, or a component name.

In another embodiment, the operation target of the business includes a target component node. Correspondingly, the processing module 1102 is further specifically configured to:

determine a difference between a quantity of component nodes in the target component node and a quantity of component nodes in the current running data of the business, where the quantity of component nodes is used for indicating a quantity of nodes in a component.

determine a node deployment task if the quantity of component nodes in the target component node is greater than the quantity of component nodes in the current running data of the business, where a quantity of nodes that need to be deployed in the node deployment task is a difference value between the quantity of component nodes in the target component node and the quantity of component nodes in the current running data of the business; or determine a node deletion task if the quantity of component nodes in the target component node is less than the quantity of component nodes in the current running data of the business, where a quantity of nodes that need to be deleted in the node deletion task is a difference value between the quantity of component nodes in the current running data of the business and the quantity of component nodes in the target component node.

In another embodiment, the operation target of the business includes target node software. Correspondingly, the processing module 1102 is further specifically configured to:

determine a difference between a software name in the target node software and a software name in the current running data of the business;

determine a software deployment task if a first software name in the target node software does not exist in the current running data of the business, where an object of the software deployment task is software corresponding to the first software name;

determine a software deletion task if a second software name in the current running data of the business does not exist in the target node software, where an object of the software deletion task is software corresponding to the second software name; and determine, if a same software name exists in the target node software and the current running data of the business, a difference between software versions corresponding to the same software name in the target node software and the current running data of the business.

Based on the foregoing embodiments, the processing module 1102 is further specifically configured to:

determine a software upgrading task if the software versions corresponding to the same software name in the target node software and the current running data of the business are different.

In another embodiment, the operation target of the business includes a target node resource. The processing module 1102 is further specifically configured to:

determine a difference between the target node resource and a node resource in the current running data of the business, where the node resource includes a computing resource, a magnetic disk resource, and a network resource; and determine a node resource maintenance task based on the difference between the target node resource and the node resource in the current running data of the business.

In another embodiment, the processing module 1102 is further specifically configured to:

determine dependencies between operation tasks of different task types based on priorities of the task types and the operation tasks, where the task types include a deployment type, a changing type, and a deletion type, a priority of the deployment type is higher than a priority of the changing type, and the priority of the changing type is higher than a priority of the deletion type; and determine dependencies between operation tasks of a same task type based on priorities of child task types of the same task type.

Figure 12:
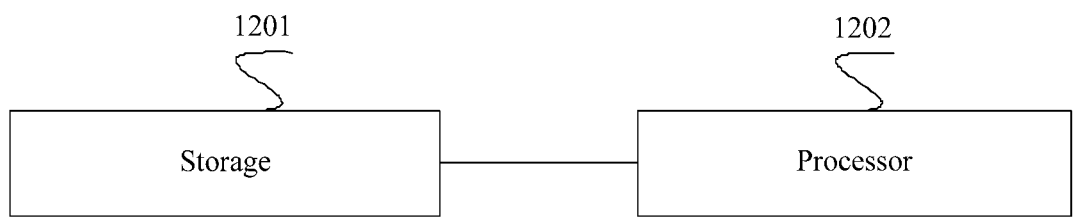
FIG. 12 is a physical block diagram of a business operation apparatus according to an embodiment of the present invention.

FIG. 12 is a physical block diagram of a business operation apparatus according to an embodiment of the present invention. As shown in FIG. 12, the apparatus includes:

a memory 1201 and a processor 1202.

The memory 1201 is configured to store a program instruction, and the processor 1202 is configured to invoke the program instruction in the memory 1201, to implement functions in the foregoing method embodiments.

Further, an embodiment of the present invention further provides a cloud computing system. The cloud computing system includes the business operation apparatus described in the foregoing embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for automatically determining and executing operation tasks in cloud computing, the method comprising:
    receiving an operation target, wherein the operation target indicates a target topology and/or target software;
    determining, based on the operation target and current running data, an operation task to be executed for implementing the operation target, wherein the current running data comprises a current topology of the business and currently running software;
    determining dependencies between a plurality of operation tasks by:
        determining dependencies between operation tasks of different task types based on priorities of the task types and the operation tasks, wherein the task types comprise a deployment type, a changing type, and a deletion type, a priority of the deployment type is higher than a priority of the changing type, and the priority of the changing type is higher than a priority of the deletion type; and
        determining dependencies between operation tasks of a same task type based on priorities of child task types of the same task type; and
    executing the operation tasks based on the dependencies between the operation tasks.

2. The method according to claim 1, wherein the operation target comprises a target application, a target service, a target service usage relationship, and a target component; and
    determining, based on the operation target of the business and current running data of the business, the at least one operation task to be executed for implementing the operation target of the business comprises:
- determining a difference between an object name in a target object and an object name in the current running data of the business;
- determining an object deployment task if a first object name in the target object does not exist in the current running data, wherein the object deployment task is configured for deploying an object corresponding to the first object name; and
- determining an object deletion task if a second object name in the current running data of the business does not exist in the target object, wherein the object deletion task is configured for deleting an object corresponding to the second object name, wherein
- the target object is the target application, the target service, the target service usage relationship, or the target component, and the object name is an application name, a service name, a service usage relationship name, or a component name.

3. The method according to claim 1, wherein the operation target comprises a target component node; and determining, based on the operation target of the business and current running data, the at least one operation task to be executed for implementing the operation target of the business comprises:
- determining a difference between a quantity of component nodes in the target component node and a quantity of component nodes in the current running data, wherein the quantity of component nodes is used for indicating a quantity of nodes in a component; and
- determining a node deployment task if the quantity of component nodes in the target component node is greater than the quantity of component nodes in the current running data, wherein a quantity of nodes to be deployed in the node deployment task is a difference value between the quantity of component nodes in the target component node and the quantity of component nodes in the current running data of the business; and
- determining a node deletion task if the quantity of component nodes in the target component node is less than the quantity of component nodes in the current running data of the business, wherein a quantity of nodes to be deleted in the node deletion task is a difference value between the quantity of component nodes in the current running data of the business and the quantity of component nodes in the target component node.

4. The method according to claim 1, wherein the operation target of the business comprises target node software; and determining, based on the operation target of the business and current running data of the business, the at least one operation task to be executed to implement the operation target comprises:
- determining a difference between a software name in the target node software and a software name in the current running data;
- determining a software deployment task if a first software name in the target node software does not exist in the current running data, wherein an object of the software deployment task is software corresponding to the first software name;
- determining a software deletion task if a second software name in the current running data does not exist in the target node software, wherein an object of the software deletion task is software corresponding to the second software name; and
- determining, if a same software name exists in the target node software and the current running data, a difference between software versions corresponding to the same software name in the target node software and the current running data.

5. The method according to claim 4, after the determining a difference between software versions corresponding to the same software name in the target node software and the current running data, the method further comprising:
- determining a software upgrading task if the software versions corresponding to the same software name in the target node software and the current running data of the business are different.

6. The method according to claim 1, wherein the operation target comprises a target node resource; and determining, based on the operation target of the business and current running data of the business, the at least one operation task that needs to be executed to implement the operation target of the business comprises:
- determining a difference between the target node resource and a node resource in the current running data, wherein the node resource comprises a computing resource, a magnetic disk resource, and a network resource; and
- determining a node resource maintenance task based on the difference between the target node resource and the node resource in the current running data.

7. An apparatus for automatically determining and executing operation tasks in cloud computing, the apparatus comprising:
- a receiver that receives an operation target, wherein the operation target indicates a target topology and/or target software; and
- a processor, configured to determine, based on the operation target and current running data, an operation task to be executed for implementing the operation target, wherein the current running data comprises a current topology and currently running software, wherein
- the processor is further configured to: determine dependencies between a plurality of operation tasks of different task types based on priorities of the task types and the operation tasks, wherein the task types comprise a deployment type, a changing type, and a deletion type, a priority of the deployment type is higher than a priority of the changing type, and the priority of the changing type is higher than a priority of the deletion type, determine dependencies between operation tasks of a same task type based on priorities of child task types of the same task type, and execute the operation tasks based on the dependencies between the operation tasks.

8. The apparatus according to claim 7, wherein the operation target comprises a target application, a target service, a target service usage relationship, and a target component; and the processor is configured to:
- determine a difference between an object name in a target object and an object name in the current running data of the business;
- determine an object deployment task if a first object name in the target object does not exist in the current running data, wherein the object deployment task is configured for deploying an object corresponding to the first object name; and
- determine an object deletion task if a second object name in the current running data does not exist in the target object, wherein the object deletion task is configured for deleting an object corresponding to the second object name, wherein the target object is the target application, the target service, the target service usage relationship, or the target component, and the object name is an application name, a service name, a service usage relationship name, or a component name.

9. The apparatus according to claim 7, wherein the operation target comprises a target component node; and the processor is further specifically configured to:

determine a difference between a quantity of component nodes in the target component node and a quantity of component nodes in the current running data, wherein the quantity of component nodes indicate a quantity of nodes in a component; and determine a node deployment task if the quantity of component nodes in the target component node is greater than the quantity of component nodes in the current running data, wherein a quantity of nodes to be deployed in the node deployment task is a difference value between the quantity of component nodes in the target component node and the quantity of component nodes in the current running data; and determine a node deletion task if the quantity of component nodes in the target component node is less than the quantity of component nodes in the current running data, wherein a quantity of nodes to be deleted in the node deletion task is a difference value between the quantity of component nodes in the current running data and the quantity of component nodes in the target component node.

10. The apparatus according to claim 7, wherein the operation target comprises target node software; and the processor is further configured to:

determine a difference between a software name in the target node software and a software name in the current running data of the business;

determine a software deployment task if a first software name in the target node software does not exist in the current running data, wherein an object of the software deployment task is software corresponding to the first software name;

determine a software deletion task if a second software name in the current running data of the business does not exist in the target node software, wherein an object of the software deletion task is software corresponding to the second software name; and determine, if a same software name exists in the target node software and the current running data, a difference between software versions corresponding to the same software name in the target node software and the current running data of the business.

11. The apparatus according to claim 10, wherein the processor is further configured to:

determine a software upgrading task if the software versions corresponding to the same software name in the target node software and the current running data of the business are different.

12. The apparatus according to claim 7, wherein the operation target of the business comprises a target node resource; and the processor is further configured to:

determine a difference between the target node resource and a node resource in the current running data, wherein the node resource comprises a computing resource, a magnetic disk resource, and a network resource; and determine a node resource maintenance task based on the difference between the target node resource and the node resource in the current running data.

* * * * *